(12) United States Patent
Hotta et al.

(10) Patent No.: US 11,919,527 B2
(45) Date of Patent: Mar. 5, 2024

(54) AUTONOMOUS DRIVING SYSTEM AND ABNORMALITY DETERMINATION METHOD

(71) Applicant: TOYOTA JIDOSHA KABUSHIKI KAISHA, Toyota (JP)

(72) Inventors: Daichi Hotta, Tokyo (JP); Nobukazu Ueki, Shizuoka-ken (JP); Sadayuki Abe, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/557,803

(22) Filed: Dec. 21, 2021

(65) Prior Publication Data

US 2022/0194397 A1    Jun. 23, 2022

(30) Foreign Application Priority Data

Dec. 23, 2020 (JP) ................................ 2020-213866

(51) Int. Cl.
*B60W 50/02* (2012.01)
*B60W 60/00* (2020.01)
*G07C 5/02* (2006.01)

(52) U.S. Cl.
CPC ...... *B60W 50/0205* (2013.01); *B60W 60/001* (2020.02); *G07C 5/02* (2013.01); *B60W 2050/0215* (2013.01)

(58) Field of Classification Search
CPC ........... B60W 50/0205; B60W 60/001; B60W 2050/0215; B60W 2050/021;

(Continued)

(56) References Cited

U.S. PATENT DOCUMENTS 9,836,062 B1 * 12/2017 Hayward ............. G08G 1/0141
2010/0114466 A1 * 5/2010 Tomita ............... G01C 21/3461
701/532

(Continued)

FOREIGN PATENT DOCUMENTS

DE    112015000359 T5    10/2016
JP    2007-155404 A    6/2007

(Continued)

OTHER PUBLICATIONS

JP-2010165242-A translation (Year: 2010).*

*Primary Examiner* — Jeff A Burke
*Assistant Examiner* — Kyle T Johnson
(74) *Attorney, Agent, or Firm* — Dinsmore & Shohl LLP

(57) ABSTRACT

An autonomous driving system configured to make an abnormality determination for an in-vehicle device at an abnormality determination point while an autonomous vehicle is driving autonomously includes: a route search unit configured to search for a travel route from a departure point to a destination point; a route determination unit configured to determine a determination route for making the abnormality determination for the in-vehicle device from the searched travel route, based on necessity of making the abnormality determination for the in-vehicle device and the number of the abnormality determination points on the travel route; and an abnormality determination unit configured to make the abnormality determination for the in-vehicle device at the abnormality determination point while the autonomous vehicle is driving along the determination route.

18 Claims, 3 Drawing Sheets

(58) Field of Classification Search
CPC ......... B60W 2555/60; B60W 2556/50; B60W 60/0011; B60W 50/00; B60W 50/02; G07C 5/02; G01C 21/3461; G01C 21/3453

See application file for complete search history.

(56) References Cited

U.S. PATENT DOCUMENTS

| | | | |
|---|---|---|---|
| 2017/0010613 A1 | 1/2017 | Fukumoto | |
| 2017/0176993 A1 | 6/2017 | Kato et al. | |
| 2018/0194364 A1* | 7/2018 | Asakura | B60W 50/0205 |
| 2018/0297612 A1 | 10/2018 | Fukamachi | |
| 2019/0012686 A1* | 1/2019 | Lawrenson | G06Q 30/0201 |
| 2019/0234745 A1* | 8/2019 | Lee | B60W 60/001 |
| 2019/0291742 A1* | 9/2019 | Leach | G01C 21/1652 |
| 2019/0381855 A1* | 12/2019 | Kim | B60H 1/00849 |
| 2020/0141743 A1* | 5/2020 | Obara | G07C 1/20 |
| 2020/0189608 A1* | 6/2020 | Braley | B60W 50/029 |
| 2020/0331484 A1* | 10/2020 | Rodriguez Bravo | G07C 5/008 |
| 2021/0094581 A1* | 4/2021 | Lee | B60W 30/10 |
| 2021/0197854 A1* | 7/2021 | Grabe | G08G 1/048 |
| 2021/0331687 A1* | 10/2021 | Li | B60W 60/001 |
| 2022/0097725 A1* | 3/2022 | Corte | B60W 60/0013 |
| 2022/0194397 A1* | 6/2022 | Hotta | G07C 5/02 |
| 2022/0324463 A1* | 10/2022 | Kawaharada | B60W 50/0205 |
| 2022/0363275 A1* | 11/2022 | Ji | B60W 50/0205 |

FOREIGN PATENT DOCUMENTS

| | | | | |
|---|---|---|---|---|
| JP | 2010-151451 A | | 7/2010 | |
| JP | 2010165242 A | * | 7/2010 | ........ B60W 50/0205 |
| JP | 2015-184243 A | | 10/2015 | |
| JP | 2018-096715 A | | 6/2018 | |
| JP | 2018-180946 A | | 11/2018 | |
| WO | WO-2019035458 A1 | * | 2/2019 | ............ B60K 28/10 |

* cited by examiner

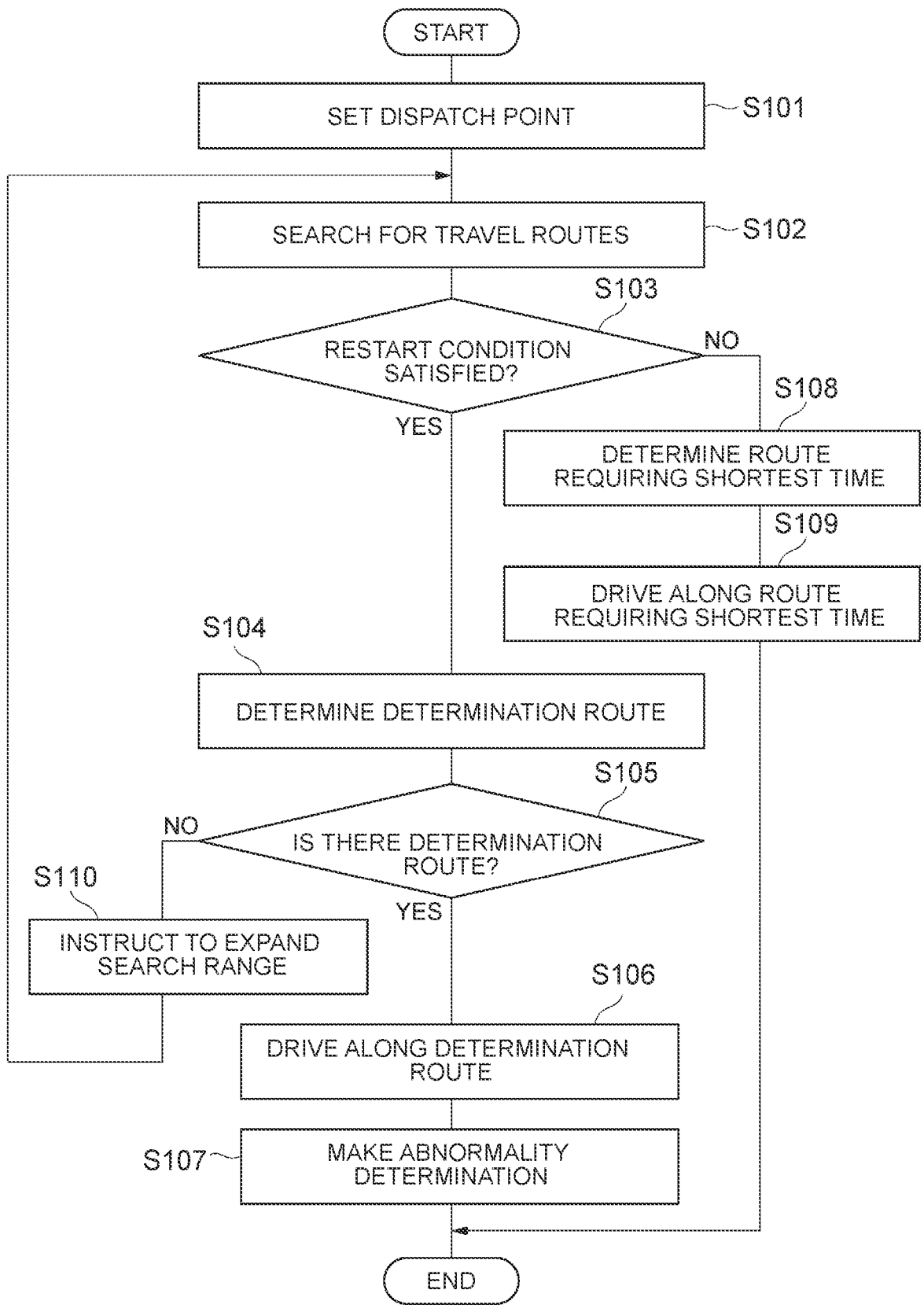

AUTONOMOUS DRIVING SYSTEM AND ABNORMALITY DETERMINATION METHOD

CROSS-REFERENCE TO RELATED APPLICATION

This application claims priority to Japanese Patent Application No. 2020-213866 filed on Dec. 23, 2020, incorporated herein by reference in its entirety.

BACKGROUND

1. Technical Field

The present disclosure relates to autonomous driving systems and abnormality determination methods that are performed in the autonomous driving systems.

2. Description of Related Art

Autonomous vehicles are equipped with various in-vehicle devices such as sensors that detect obstacles around the vehicle. In such autonomous vehicles, it is difficult to properly perform autonomous driving control if there is an abnormality in any of the in-vehicle devices. For example, Japanese Unexamined Patent Application Publication No. 2018-096715 (JP 2018-096715 A) describes that an in-vehicle sensor is calibrated while an autonomous vehicle is driving. In this system, the in-vehicle sensor is calibrated when the autonomous vehicle reaches a calibration point while driving autonomously. JP 2018-096715 A also describes that when generating a travel route for autonomous driving, priority is given to a route passing through the calibration point.

SUMMARY

In the case where calibration is performed when an autonomous vehicle reaches a predetermined point as described in JP 2018-096715 A, whether there is an abnormality in an in-vehicle device may be determined according to the result of the calibration process (hereinafter this determination is referred to as abnormality determination). One example of such a situation is when an error is too large to calibrate when calibration is attempted. However, when an autonomous vehicle travels along a route passing through an abnormality determination point in order to make an abnormality determination for an in-vehicle device even though there is not so much necessity of making the abnormality determination for the in-vehicle device, the time and distance required for the autonomous vehicle to reach a destination point may be increased.

Accordingly, the following system and method are desired in the present technical field: an autonomous driving system that can appropriately determine a route for making an abnormality determination for an in-vehicle device based on the necessity of making the abnormality determination for the in-vehicle device and can make the abnormality determination for the in-vehicle device while an autonomous vehicle is driving, and an abnormality determination method that is performed in the autonomous driving system. The present disclosure provides the autonomous driving system and the abnormality determination method.

A first aspect of the present disclosure is an autonomous driving system configured to make an abnormality determination for an in-vehicle device at an abnormality determination point while an autonomous vehicle is driving autonomously. The autonomous driving system includes: a route search unit configured to search for a travel route from a departure point to a destination point; a route determination unit configured to determine a determination route for making the abnormality determination for the in-vehicle device from the searched travel route, based on necessity of making the abnormality determination for the in-vehicle device and the number of the abnormality determination points on the travel route; and an abnormality determination unit configured to make the abnormality determination for the in-vehicle device at the abnormality determination point while the autonomous vehicle is driving along the determination route.

In the first aspect, the determination route is determined based on the necessity of making the abnormality determination for the in-vehicle device and the number of the abnormality determination points on the travel route. In the first aspect, the abnormality determination for the in-vehicle device is made at the abnormality determination point while the autonomous vehicle is autonomously driving along the determination route. According to the first aspect, the route for making the abnormality determination for the in-vehicle device can be appropriately determined based on the necessity of making the abnormality determination for the in-vehicle device, and the abnormality determination for the in-vehicle device can be made while the autonomous vehicle is driving.

In the first aspect, a situation where a restart condition is satisfied is a situation in which there is the necessity of making the abnormality determination for the in-vehicle device, the restart condition being a condition indicating that the autonomous vehicle has been restarted. The route determination unit may be configured to, when the restart condition is satisfied, determine the travel route as the determination route, the travel route being a route in which the number of the abnormality determination points is equal to or greater than a predetermined number threshold.

For example, an abnormality may occur in the in-vehicle device before the autonomous vehicle is restarted, such as a lens of an in-vehicle camera becoming dirty due to the rain or wind. In this case, the driving performance of the autonomous vehicle may be degraded due to the abnormality in the in-vehicle device after the autonomous vehicle is restarted. According to the above configuration, the abnormality determination for the in-vehicle device is made when the restart condition is satisfied. The abnormality determination can thus be made at an appropriate timing. According to the above configuration, the travel route in which the number of the abnormality determination points is equal to or greater than the number threshold is determined to be the determination route. The abnormality determination can thus be made for the in-vehicle device an appropriate number of times.

In the first aspect, the number threshold may be determined in advance for each type of the abnormality determination points, and the route determination unit may be configured to determine the travel route as the determination route, the travel route being a route in which the number of the abnormality determination points of at least one type is equal to or greater than the corresponding number threshold to be the determination route.

According to the above configuration, the route determination unit can determine a more appropriate route to be the determination route for making the abnormality determination, based on the number threshold set for each type of the abnormality determination points.

In the first aspect, the route determination unit may be configured to determine the travel route requiring shortest time to reach the destination point to be the determination route when there is a plurality of the travel routes in which the number of the abnormality determination points is equal to or greater than the number threshold.

According to the above configuration, the autonomous driving system can make the abnormality determination for the in-vehicle device and can also cause the autonomous vehicle to reach the destination point more quickly.

In the first aspect, the route determination unit may be configured to determine the travel route with the largest number of the abnormality determination points for a pre-determined type as the determination route when there is a plurality of the travel routes. The travel routes may be routes in which the number of the abnormality determination points is equal to or greater than the number threshold.

According to the above configuration, the autonomous driving system can mainly make the abnormality determination corresponding to the abnormality determination point at each abnormality determination point of the predetermined type.

In the first aspect, the route search unit may be configured to expand a search range and further search for the travel route when the determination route is not determined by the route determination unit.

According to the above configuration, the autonomous driving system can increase the possibility that the route search unit can search for the travel route that passes through an appropriate number of the abnormality determination points.

In the first aspect, the autonomous driving system may further include a driving control unit configured to control driving of the autonomous vehicle and drive the autonomous vehicle autonomously along the determination route. The driving control unit may be configured to drive the autonomous vehicle along the determination route when there is no occupant in the autonomous vehicle.

According to the above configuration, since there is no occupant in the autonomous vehicle, the autonomous driving system can make the abnormality determination for the in-vehicle device while the autonomous vehicle is driving along the determination route without making the occupant feel uneasy regarding the route along which the autonomous vehicle drives during the abnormality determination.

A second aspect of the present disclosure is an abnormality determination method that is performed by an autonomous driving system configured to make an abnormality determination for an in-vehicle device at an abnormality determination point while an autonomous vehicle is driving autonomously. The autonomous driving method includes: a route search step of searching for a travel route from a departure point to a destination point; a route determination step of determining a determination route for making the abnormality determination for the in-vehicle device from the searched travel route, based on necessity of making the abnormality determination for the in-vehicle device and the number of the abnormality determination points on the travel route; and an abnormality determination step of making the abnormality determination for the in-vehicle device at the abnormality determination point while the autonomous vehicle is driving along the determination route.

In the second aspect, the determination route is determined based on the necessity of making the abnormality determination for the in-vehicle device and the number of the abnormality determination points on the travel route. In the second aspect, the abnormality determination for the in-vehicle device is made at the abnormality determination point while the autonomous vehicle is autonomously driving along the determination route. According to the second aspect, the route for making the abnormality determination for the in-vehicle device can be appropriately determined based on the necessity of making the abnormality determination for the in-vehicle device, and the abnormality determination for the in-vehicle device can be made while the autonomous vehicle is driving.

A third aspect of the present disclosure is an autonomous driving system including an electronic control unit. The electronic control unit is configured to: make an abnormality determination for an in-vehicle device at an abnormality determination point while an autonomous vehicle is driving autonomously; search for a travel route from a departure point to a destination point; determine a determination route for making the abnormality determination for the in-vehicle device from the searched travel route, based on necessity of making the abnormality determination for the in-vehicle device and the number of the abnormality determination points on the travel route; and make the abnormality determination for the in-vehicle device at the abnormality determination point while the autonomous vehicle is driving along the determination route.

In the third aspect, a situation where a restart condition is satisfied is a situation in which there is the necessity of making the abnormality determination for the in-vehicle device, the restart condition being a condition indicating that the autonomous vehicle has been restarted. The electronic control unit may be configured to, when the restart condition is satisfied, determine the travel route as the determination route. The ravel route may be a route in which the number of the abnormality determination points is equal to or greater than a predetermined number threshold.

In the third aspect, the number threshold may be determined in advance for each type of the abnormality determination points, and the electronic control unit may be configured to determine the travel route as the determination route. The travel route may be a route in which the number of the abnormality determination points of at least one type is equal to or greater than the corresponding number threshold to be the determination route.

In the third aspect, the electronic control unit may be configured to determine the travel route requiring shortest time to reach the destination point to be the determination route when there is a plurality of the travel routes in which the number of the abnormality determination points is equal to or greater than the number threshold.

In the third aspect, the electronic control unit may be configured to determine the travel route with the largest number of the abnormality determination points for a predetermined type as the determination route when there is a plurality of the travel routes. The travel routes may be routes in which the number of the abnormality determination points is equal to or greater than the number threshold.

In the third aspect, the electronic control unit may be configured to expand a search range and further search for the travel route when the determination route is not determined by the electronic control unit.

In the third aspect, the electronic control unit may be configured to control driving of the autonomous vehicle and may be configured to drive the autonomous vehicle autonomously along the determination route. The electronic control unit may be configured to drive the autonomous vehicle along the determination route when there is no occupant in the autonomous vehicle.

According to the first, second, and third aspects of the present disclosure, the route for making the abnormality determination for the in-vehicle device can be appropriately determined based on the necessity of making the abnormality determination for the in-vehicle device, and the abnormality determination for the in-vehicle device can be made while the autonomous vehicle is driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of an abnormality determination process that is performed by the autonomous driving system.

DETAILED DESCRIPTION OF EMBODIMENTS

Figure 1:
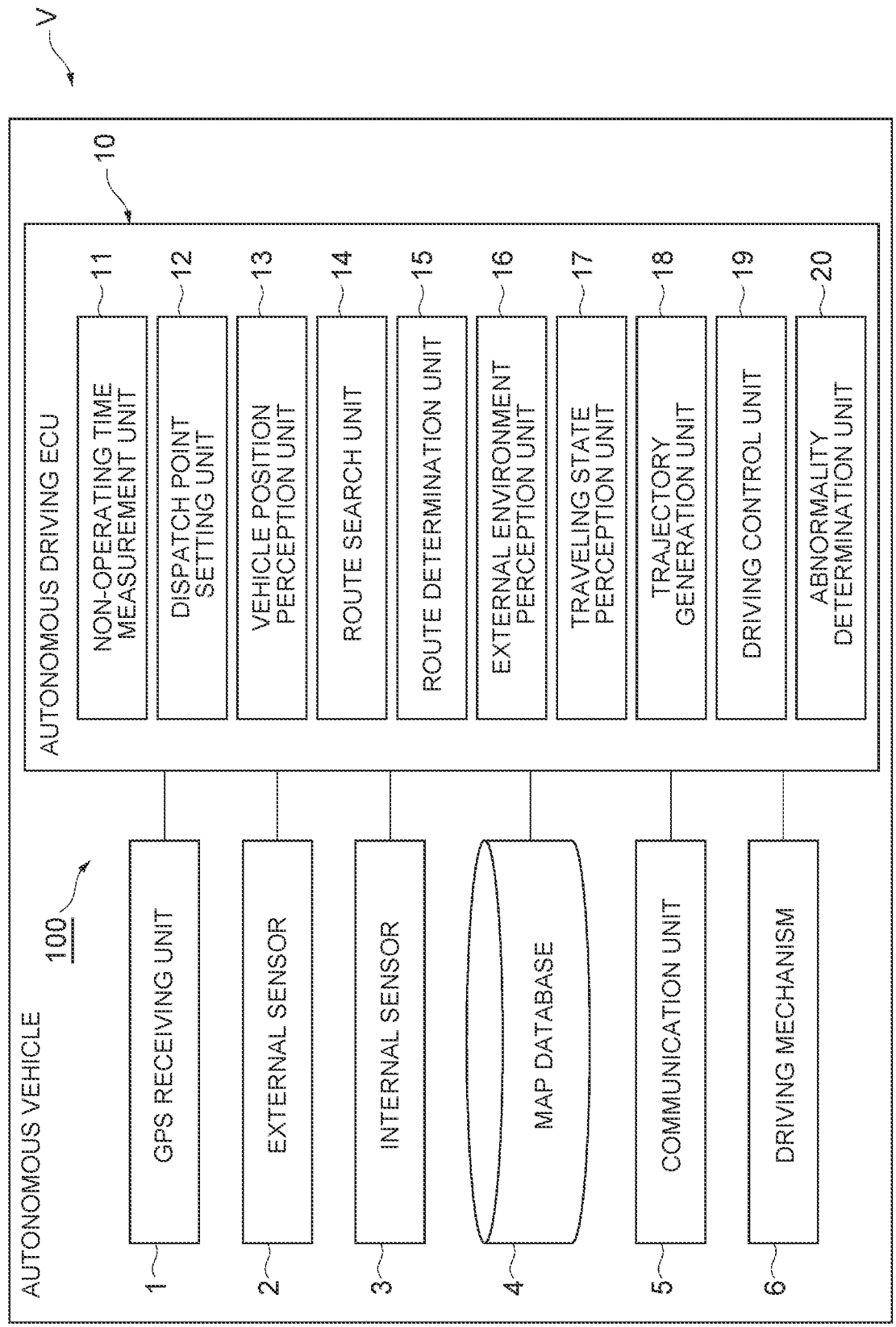
FIG. 1 is a block diagram showing an example of a configuration of an autonomous vehicle to which an autonomous driving system according to an embodiment is applied.

Hereinafter, an exemplary embodiment will be described with reference to the drawings. In the drawings, the same or corresponding elements will be denoted by the same reference signs, and description thereof will not be repeated.

An autonomous vehicle V shown in FIG. 1 is a vehicle that can drive autonomously regardless of whether the vehicle is manned or unmanned. For example, the autonomous vehicle V is used for services for transporting a user. In the present embodiment, as an example, the autonomous vehicle V is an on-demand autonomous bus or taxi that drives to a pickup point (dispatch point), picks up a user, and then transports the user to a designated destination point.

As shown in FIG. 1, an autonomous driving system 100 is mounted on the autonomous vehicle V and autonomously drives the autonomous vehicle V. The autonomous driving system 100 makes an abnormality determination for an in-vehicle device at an abnormality determination point while the autonomous vehicle V is driving autonomously. The autonomous driving system 100 includes a Global Positioning System (GPS) receiving unit 1, an external sensor 2, an internal sensor 3, a map database 4, a communication unit 5, a driving mechanism 6, and an autonomous driving electronic control unit (ECU) 10.

The autonomous driving ECU 10 is an electronic control unit having a processor such as central processing unit (CPU) and memories such as read only memory (ROM) and random access memory (RAM). For example, the autonomous driving ECU 10 implements various functions by loading a program recorded in the ROM into the RAM and causing the CPU to execute the program loaded in the RAM. The autonomous driving ECU 10 may be composed of a plurality of electronic control units.

The autonomous driving ECU 10 is connected to the GPS receiving unit 1, the external sensor 2, the internal sensor 3, the map database 4, the communication unit 5, and the driving mechanism 6.

The GPS receiving unit 1 measures the position of the autonomous vehicle V (e.g., the latitude and longitude of the autonomous vehicle V) by receiving signals from three or more GPS satellites. The GPS receiving unit 1 sends the measured position information of the autonomous vehicle V to the autonomous driving ECU 10.

The external sensor 2 is an in-vehicle sensor that detects the external environment of the autonomous vehicle V. The external sensor 2 includes at least a camera. The camera is an imaging device that captures images of the external environment of the autonomous vehicle V.

The external sensor 2 may include a radar sensor. The radar sensor is a detection device that detects an object around the autonomous vehicle V using radio waves (e.g., millimeter waves) or light. The radar sensor includes, for example, a millimeter wave radar or a light detection and ranging (LIDAR) sensor. The radar sensor detects an object by transmitting radio waves or light to the vicinity of the autonomous vehicle V and receiving the radio waves or light reflected from the object. The external sensor 2 may include a sonar sensor that detects sound outside the autonomous vehicle V.

The internal sensor 3 is an in-vehicle sensor that detects the traveling state of the autonomous vehicle V. The internal sensor 3 includes, for example, a vehicle speed sensor, an acceleration sensor, and a yaw rate sensor. The vehicle speed sensor is a detector that detects the speed of the autonomous vehicle V. The acceleration sensor is a detector that detects the acceleration of the autonomous vehicle V. The acceleration sensor includes, for example, a longitudinal acceleration sensor that detects the acceleration in the longitudinal direction of the autonomous vehicle V. The acceleration sensor may include a lateral acceleration sensor that detects the lateral acceleration of the autonomous vehicle V. The yaw rate sensor is a detector that detects the yaw rate (rotational angular velocity) about the vertical axis of the center of gravity of the autonomous vehicle V. For example, a gyro sensor may be used as the yaw rate sensor.

The map database 4 is a database that records map information. For example, the map database 4 is created in a recording device such as hard disk drive (HDD) mounted on the autonomous vehicle V. The map information includes, for example, position information of roads, information (e.g., curvature information) on road shapes, position information of intersections and branch points, etc. The map information may include traffic regulation information such as speed limits associated with the position information. The map information may include landmark information that is used to acquire the position information of the autonomous vehicle V. Examples of landmarks include road signs, road markings, traffic lights, and utility poles. The map information may include position information of bus stops. The map database 4 may be configured in a server capable of communicating with the autonomous vehicle V.

The communication unit 5 is a communication device that controls wireless communication with the outside of the autonomous vehicle V. The communication unit 5 sends and receives various kinds of information to and from an external server etc. via a wireless communication network.

The driving mechanism 6 is a mechanism that is used to drive the autonomous vehicle V. The driving mechanism 6 includes at least a drive mechanism, a brake mechanism, and a steering mechanism. The drive mechanism includes a driving source and a transmission mechanism that transmits the driving force of the driving source to wheels of the autonomous vehicle V. In the drive mechanism, the driving source is controlled based on control signals from the autonomous driving ECU 10, and the transmission mechanism transmits the driving force to the wheels. An engine or a motor can be used as the driving source. When the autonomous vehicle V is a hybrid vehicle, an engine and a motor can be used as the driving source.

The brake mechanism applies a braking force to the wheels of the autonomous vehicle V according to control signals from the autonomous driving ECU 10. For example, a hydraulic brake system can be used as the brake mechanism. The steering mechanism is a mechanism that steers the wheels of the vehicle based on control signals from the autonomous driving ECU 10. An electric power steering system can be used as the steering mechanism.

The autonomous driving ECU 10 functionally includes a non-operating time measurement unit 11, a dispatch point setting unit 12, a vehicle position perception unit 13, a route search unit 14, a route determination unit 15, an external environment perception unit 16, a traveling state perception unit 17, a trajectory generation unit 18, a driving control unit 19, and an abnormality determination unit 20.

The non-operating time measurement unit 11 measures the duration during which the autonomous vehicle V has stopped providing the service as the non-operating time. For example, the autonomous vehicle V having stopped providing the service means that after finishing providing the service for transporting a user, the autonomous vehicle V is waiting (stopped) until it receives the next instruction to start providing the service. That is, the non-operating time means the period from when the autonomous vehicle V enters a standby (stopped) state after finishing transporting a user to when the autonomous driving system 100 receives the next request to start the service. The non-operating time may be the period during which autonomous driving of the autonomous vehicle V is stopped due to bad weather etc. and the vehicle is stopped on a public road, a parking lot, etc. In this case, the non-operating time is reset when autonomous driving of the autonomous vehicle V is resumed.

The dispatch point setting unit 12 sets a dispatch point to which the autonomous vehicle V is sent by autonomous driving. For example, the dispatch point setting unit 12 acquires information on a dispatch point from the external server etc. via the communication unit 5 and sets the dispatch point. The dispatch point is a pickup point where the user gets into the autonomous vehicle V. That is, the dispatch point is a point where the autonomous vehicle V picks up the user who wants to use the service. Therefore, when heading for the dispatch point, the autonomous vehicle V autonomously drives to the dispatch point in an unmanned state. The dispatch point is thus different from a final destination point to which the user travels after getting into the autonomous vehicle V.

The vehicle position perception unit 13 perceives position information (position on a map) of the autonomous vehicle V based on the position information from the GPS receiving unit 1 and the map information in the map database 4. The vehicle position perception unit 13 may perceive the position information of the autonomous vehicle V by a simultaneous localization and mapping (SLAM) technique using the landmark information included in the map information in the map database 4 and the detection results of the external sensor 2. The vehicle position perception unit 13 may perceive the lateral position of the autonomous vehicle V with respect to the lane (position of the autonomous vehicle V in the lateral direction of the lane) from the positional relationship between the lane markings and the autonomous vehicle V and may include the perceived lateral position of the autonomous vehicle V in the position information. Alternatively, the vehicle position perception unit 13 may perceive the position information of the autonomous vehicle V by a predetermined method. This position information may include the orientation of the autonomous vehicle V.

The route search unit 14 searches for a travel route from a departure point to the dispatch point (destination point) set by the dispatch point setting unit 12. In the present embodiment, as an example, the departure point is the position (current position) of the autonomous vehicle V perceived by the vehicle position perception unit 13.

Specifically, the route search unit 14 searches for a travel route from the current position of the autonomous vehicle V to the dispatch point based on the position information perceived by the vehicle position perception unit 13 and the map information in the map database 4. In the present embodiment, the route search unit 14 searches for a plurality of travel routes from the current position to the dispatch point. For example, the route search unit 14 searches for a plurality of possible travel routes on the map, including not only the shortest route from the current position to the dispatch point but also a detour route from the current position to the dispatch point.

The route search unit 14 calculates, for each of the searched travel routes, the time required to reach the dispatch point when the autonomous vehicle V drives along the travel route. The route search unit 14 can calculate the time required to reach the dispatch point by various predetermined methods based on, for example, the traffic regulation information etc. included in the map information.

The route search unit 14 calculates, for each of the searched travel routes, right turn points and left turn points required to drive the autonomous vehicle V along the travel route. The route search unit 14 can calculate the right and left turn points by various predetermined methods based on, for example, the information on road shapes etc. included in the map information.

The route search unit 14 calculates, for each of the searched travel routes, traffic light points, namely points where a traffic light is installed, on the travel route. The route search unit 14 can calculate the traffic light points by various predetermined methods based on, for example, the information on traffic lights etc. included in the map information.

When none of the searched travel routes is determined to be a determination route by the route determination unit 15, the route search unit 14 expands the search range and searches for travel routes again. Expanding the search range may mean expanding the area on the map when searching for travel routes, or may mean increasing the allowable time required to reach the dispatch point when searching for travel routes.

The route determination unit 15 determines a determination route for making an abnormality determination for an in-vehicle device mounted on the autonomous vehicle V from the travel routes searched by the route search unit 14. In this example, the route determination unit 15 determines a determination route from the searched travel routes based on the necessity of making the abnormality determination for the in-vehicle device and the number of abnormality determination points on each of the searched travel routes.

The in-vehicle device for which the abnormality determination is made herein refers to various devices mounted on the autonomous vehicle V such as a device related to perception of the position of the autonomous vehicle V, a device related to perception of the external environment of the autonomous vehicle V, and a device related to driving of the autonomous vehicle V. Specifically, the in-vehicle device may be, for example, the GPS receiving unit 1 and the external sensor 2 that are used to perceive the position of the autonomous vehicle V. The in-vehicle device may be the external sensor 2 that is used to perceive the external environment of the autonomous vehicle V. The in-vehicle device may be the driving mechanism 6 that is used to drive the autonomous vehicle V.

Whether there is the necessity of making the abnormality determination is determined in advance based on various conditions. For example, whether there is the necessity of making the abnormality determination may be determined based on the possibility of occurrence of an abnormality in the in-vehicle device. For example, an abnormality may occur in the in-vehicle device due to the weather or external factors (vandalism etc.). Therefore, whether there is the necessity of making the abnormality determination may be determined based on the possibility of occurrence of an abnormality due to the weather or external factors.

In the present embodiment, the situation in which there is the necessity of making the abnormality determination is when a restart condition is satisfied. The restart condition is a condition indicating that the autonomous vehicle V has been restarted. For example, an abnormality may occur in the in-vehicle device due to the weather or external factors before the autonomous vehicle V is restarted. It is therefore required to determine whether there is an abnormality in the in-vehicle device after the autonomous vehicle V is restarted. Accordingly, in the present embodiment, the situation in which the restart condition is satisfied is used as the situation in which there is the necessity of making the abnormality determination.

In the present embodiment, as an example, the restart condition may be determined using the non-operating time measured by the non-operating time measurement unit 11. In this case, the route determination unit 15 may determine that the restart condition is satisfied when the measured non-operating time is equal to or greater than a predetermined non-operating time threshold.

The restart condition may be determined based on whether the autonomous driving system 100 is down. The autonomous driving system 100 being down is the state in which the functions of the autonomous driving system 100 are stopped, such as when the power supply of the autonomous driving system 100 is turned off etc. by an administrator etc. in order to end the operation of the autonomous vehicle V and when the power supply of the autonomous driving system 100 is unintentionally turned off etc. In this case, the route determination unit 15 may determine that the restart condition is satisfied when the autonomous driving system 100 is down or when the autonomous driving system 100 has been down for a predetermined down time threshold or more.

The abnormality determination point is a point set in advance in order to make the abnormality determination for the in-vehicle device of the autonomous vehicle V. As the abnormality determination point, for example, a plurality of types of points may be set according to the type of in-vehicle device for which the abnormality determination is made. The abnormality determination point may be determined based on the road shape, structures installed on the road, etc. In the present embodiment, traffic light points, right turn points, and left turn points are determined as the abnormality determination points. The traffic light points are points where a traffic signal is installed, the right turn points are points where the autonomous vehicle V turns right while traveling, and the left turn points are points where the autonomous vehicle V turns left while traveling.

As described above, when the restart condition is satisfied, the route determination unit 15 determines a determination route for making the abnormality determination for the in-vehicle device from the travel routes searched by the route search unit 14, based on the number of abnormality determination points in each of the searched travel routes.

In the present embodiment, when determining a determination route based on the number of abnormality determination points, the route determination unit 15 determines a determination route based on whether the number of abnormality determination points on the route is equal to or greater than a predetermined number threshold. That is, in the present embodiment, when the restart condition is satisfied, the route determination unit 15 determines the searched travel route in which the number of abnormality determination points is equal to or greater than the predetermined number threshold to be a determination route. For example, the number threshold is set to a value of 1 or greater.

The number threshold may be determined in advance for each type of abnormality determination points. For example, different number thresholds may be set for each type of abnormality determination points, such as one for the traffic light points, two for the right turn points, and two for the left turn points. In the present embodiment, the number threshold is determined in advance for each type of abnormality determination points. In this case, the route determination unit 15 determines the travel route in which the number of abnormality determination points of each type is equal to or greater than the corresponding number threshold to be a determination route.

In the present embodiment, the route determination unit 15 determines a determination route from the travel routes searched by the route search unit 14, based on the travel route for which the time required to reach the dispatch point is equal to or less than or a predetermined required time threshold. As an example, the required time threshold may be set based on the time required to reach the dispatch point by the shortest route with the shortest traveling distance to the dispatch point out of the travel routes to the dispatch point plus a predetermined margin time.

As described above, when the restart condition is satisfied, the route determination unit 15 determines the travel route satisfying both the condition of the time required to reach the dispatch point (equal to or less than the required time threshold) and the condition of the threshold of the number of abnormality determination points (equal to or greater than the number threshold) to be a determination route.

Figure 2:
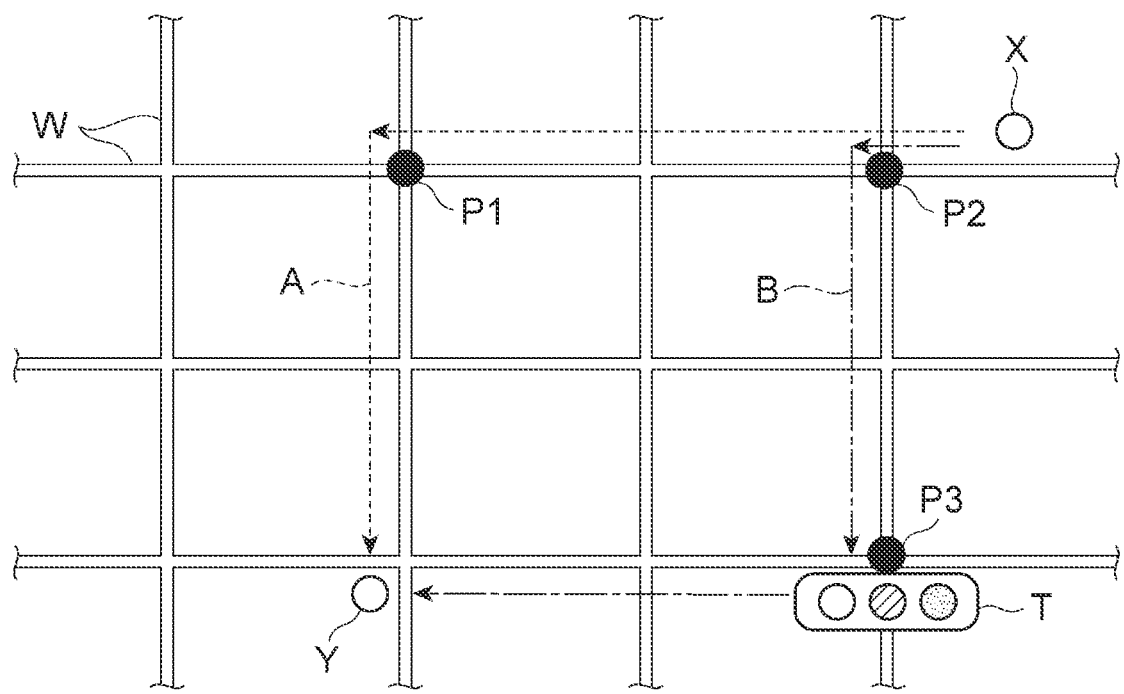
FIG. 2 is a schematic view showing a determination route determined based on abnormality determination points.

A specific example of the situation in which it is determined that the restart condition is satisfied and a determination route is determined from the travel routes to the dispatch point will be described with reference to FIG. 2. FIG. 2 shows a first travel route A and a second travel route B that have been searched by the route search unit 14 as travel routes from a departure point X to a dispatch point Y on a road W in a grid pattern. Both the first travel route A and the second travel route B satisfy the condition of the time required to reach the dispatch point Y (equal to or less than the required time threshold). In this example, as the condition of the threshold of the number of abnormality determination points, all of a number threshold S for the traffic light points, a number threshold R for the right turn points, and a number threshold L for the left turn points are set in advance to one or more.

The first travel route A is a route including zero traffic light points, zero right turn points, and one left turn point (point P1). The second travel route B is a route including one traffic light point (point P3) where a traffic light T is installed, one right turn point (point P3), and one left turn point (point P2). In this case, the route determination unit 15 determines, out of the searched first travel route A and the second travel route B, the second travel route B satisfying all of the conditions of being equal to or greater than the preset number threshold S, being equal to or greater than the preset number threshold R, and being equal to or greater than the preset number threshold L to be a determination route for making the abnormality determination for the in-vehicle device.

Examples of various methods in which the route determination unit 15 determines a determination route when there is a plurality of travel routes satisfying the condition of the threshold of the number of abnormality determination points (the condition that the number of abnormality determination points is equal to or greater than the number threshold) will be described. It is herein assumed that the travel routes satisfying the condition of the threshold of the number of abnormality determination points satisfy the condition of the time required to reach the dispatch point (the condition that the time required to reach the dispatch point is equal to or less than the required time threshold).

First Determination Method

As a first determination method, the route determination unit 15 can determine a determination route based on the time required to reach the dispatch point by each travel route. When there is a plurality of travel routes satisfying the condition of the threshold of the number of abnormality determination points, the route determination unit 15 can determine the travel route that requires the shortest time to the dispatch point to be a determination route.

Second Determination Method

As a second determination method, the route determination unit 15 can determine a determination route based on the number of abnormality determination points of a predetermined type. When there is a plurality of travel routes satisfying the condition of the threshold of the number of abnormality determination points, the route determination unit 15 can determine the travel route with the largest number of abnormality determination points of the predetermined type to be a determination route. The number of abnormality determination points of the predetermined type may be the sum of the numbers of abnormality determination points of two or more types. That is, as an example, the route determination unit 15 may determine the travel route with the largest sum of the number of right turn points and the number of left turn points to be a determination route.

The route determination unit 15 does not necessarily use the first determination method and the second determination method when there is a plurality of travel routes satisfying the condition of the threshold of the number of abnormality determination points. The route determination unit 15 may determine a determination route by a method other than the first and second determination methods.

There are cases where the route determination unit 15 cannot determine a determination route from the travel routes searched by the route search unit 14. The situation in which the route determination unit 15 cannot determine a determination route is when where none of the travel routes searched by the route search unit 14 satisfies the following two conditions: the condition of the time required to reach the dispatch point and the condition of the threshold of the number of abnormality determination points. In this situation, the route determination unit 15 instructs the route search unit 14 to expand the search range and search for travel routes again. The route determination unit 15 performs a process of determining a determination route based on the travel routes searched in the expanded search range by the route search unit 14.

The route determination unit 15 does not determine a determination route from the searched travel routes when there is no necessity of making the abnormality determination for the in-vehicle device, that is, in the present embodiment, when the restart condition is not satisfied. In this case, the route determination unit 15 determines the travel route for the autonomous vehicle V to autonomously drive to the dispatch point from the travel routes searched by the route search unit 14 based on a predetermined determination criterion. In the present embodiment, as an example, the route determination unit 15 determines the route requiring the shortest time from the current position of the autonomous vehicle V to the dispatch point out of the searched travel routes to be a travel route to the dispatch point.

The route determination unit 15 will not determine a determination route when there is a service user (passenger) in the autonomous vehicle V. An example of such a situation is when the autonomous vehicle V with the user therein drives to the dispatch point (pickup point) to pick up another user. In this case, as in the case where there is no necessity of making the abnormality determination for the in-vehicle device, the route determination unit 15 determines the travel route requiring the shortest time to reach the dispatch point out of the travel routes searched by the route search unit 14 to be a travel route to the dispatch point. That is, the autonomous driving system 100 (driving control unit 19) drives the autonomous vehicle V along the determination route when there is no passenger in the autonomous vehicle V.

The external environment perception unit 16 perceives the external environment of the autonomous vehicle V based on the detection results of the external sensor 2. The external environment includes the positions of objects around the autonomous vehicle V relative to the autonomous vehicle V. The external environment includes the perception results of the traffic lights and the lighting states of the traffic lights. The external environment perception unit 16 perceives a traffic light in front of the autonomous vehicle V and the lighting state of the traffic light (e.g., whether the lighting state of the traffic light indicates that vehicles are allowed to move forward or not allowed to move forward) based on, for example, images captured by the camera of the external sensor 2. The external environment may include the speeds of objects around the autonomous vehicle V relative to the autonomous vehicle V and the directions in which the objects are moving relative to the autonomous vehicle V. The external environment may include the types of objects such as other vehicles, pedestrians, and bicycles. The types of objects can be identified by a method such as pattern matching. The external environment may include the results of perception of lane markings (perception of white lines) around the autonomous vehicle V.

The traveling state perception unit 17 perceives the traveling state of the autonomous vehicle V based on the detection results of the internal sensor 3. The traveling state includes the speed of the autonomous vehicle V, the acceleration of the autonomous vehicle V, and the yaw rate of the autonomous vehicle V. Specifically, the traveling state perception unit 17 perceives the speed of the autonomous vehicle V based on vehicle speed information from the vehicle speed sensor. The traveling state perception unit 17 perceives the acceleration of the autonomous vehicle V based on acceleration information from the acceleration sensor. The traveling state perception unit 17 perceives the orientation of the autonomous vehicle V based on yaw rate information from the yaw rate sensor.

The trajectory generation unit 18 generates a trajectory to be used for autonomous driving of the autonomous vehicle V. The trajectory generation unit 18 generates an autonomous driving trajectory to the dispatch point based on the determination route determined by the route determination unit 15, the map information, the position information of the autonomous vehicle V, the external environment of the autonomous vehicle V, and the traveling state of the autonomous vehicle V. The trajectory corresponds to a travel plan for autonomous driving.

The trajectory includes a path along which the vehicle autonomously drives and a vehicle speed plan for the autonomous driving. The path is a locus along which the vehicle that is driving autonomously is going to travel on the determination route. For example, the path may be data (steering angle plan) on a change in steering angle of the autonomous vehicle V according to the positions on the determination route. For example, the positions on the determination route are set longitudinal positions set at predetermined intervals (e.g., at intervals of 1 m) in the traveling direction on the determination route. The steering angle plan is data in which a desired steering angle is associated with each set longitudinal position.

The trajectory generation unit 18 generates a path along which the autonomous vehicle V travels based on, for example, the determination route, the map information, the external environment of the autonomous vehicle V, and the traveling state of the autonomous vehicle V. For example, the trajectory generation unit 18 generates such a path that the autonomous vehicle V drives in the middle of the lane (middle in the lateral direction of the lane) included in the determination route.

For example, the vehicle speed plan is data in which a desired vehicle speed is associated with each set longitudinal position. The set longitudinal positions may be set based on the traveling time of the autonomous vehicle V instead of the distance. For example, the set longitudinal positions may be set as the position the vehicle will reach after a second and the position the vehicle will reach after 2 seconds. In this case, the vehicle speed plan can also be expressed as data according to the traveling time.

The trajectory generation unit 18 generates the vehicle speed plan based on, for example, the path and the traffic regulation information such as speed limits included in the map information. Speeds set in advance for the positions or sections on the map may be used instead of the speed limits. The trajectory generation unit 18 generates an autonomous driving trajectory from the determination route and the vehicle speed plan. The method for generating a trajectory by the trajectory generation unit 18 is not limited to the above, and a method related to autonomous driving may be used. The same applies to the trajectory.

The driving control unit 19 performs autonomous driving to control driving of the autonomous vehicle V so that the autonomous vehicle V drives autonomously along the determination route. The driving control unit 19 autonomously drives the autonomous vehicle V to the dispatch point based on, for example, the external environment of the autonomous vehicle V, the traveling state of the autonomous vehicle V, and the trajectory generated by the trajectory generation unit 18. The driving control unit 19 autonomously drives the autonomous vehicle V by sending control signals to the driving mechanism 6.

As described above, when there is no necessity of making the abnormality determination for the in-vehicle device or when there is a user in the autonomous vehicle V, the route determination unit 15 does not determine a determination route but determines the travel route requiring the shortest time to reach the dispatch point to be a travel route to the dispatch point in the present embodiment. In this case, as in the case where the determination route is determined, the driving control unit 19 performs autonomous driving to autonomously drive the autonomous vehicle V along the travel route determined by the route determination unit 15. Specifically, the trajectory generation unit 18 generates a trajectory based on the travel route requiring the shortest time to reach the dispatch point, as in the case where the trajectory generation unit 18 generates a trajectory based on the determination route. The driving control unit 19 controls driving of the autonomous vehicle V based on the trajectory generated by the trajectory generation unit 18, so that the autonomous vehicle V drives autonomously to the dispatch point along the travel route requiring the shortest time to reach the dispatch point.

The abnormality determination unit 20 makes the abnormality determination for the in-vehicle device at the abnormality determination point while the autonomous vehicle V is driving along the determination route determined by the route determination unit 15. At the abnormality determination point, the abnormality determination unit 20 makes the abnormality determination for the in-vehicle device according to the type of abnormality determination point.

For example, when the abnormality determination point is a traffic light point, the abnormality determination unit 20 determines as the abnormality determination whether the traffic light can be perceived correctly. When the traffic light cannot be perceived correctly, an abnormality may have occurred in, for example, the camera of the external sensor 2. The abnormality determination unit 20 therefore determines at the traffic light point whether an abnormality has occurred in, for example, the camera. In this case, for example, the camera of the external sensor 2 is the in-vehicle device for which the abnormality determination is made.

For example, when the abnormality determination point is a right turn point or a left turn point, the abnormality determination unit 20 determines as the abnormality determination whether the autonomous vehicle V can make a right turn or a left turn correctly. For example, when the autonomous vehicle V cannot make a right turn or a left turn correctly, an abnormality may have occurred in, for example, the steering mechanism of the driving mechanism 6. The abnormality determination unit 20 therefore determines at the right turn point or the left turn point whether an abnormality has occurred in, for example, the steering mechanism. In this case, for example, the steering mechanism of the driving mechanism 6 is the in-vehicle device for which the abnormality determination is made.

For example, when the autonomous vehicle V cannot make a right turn or a left turn correctly, the vehicle position perception unit 13 may have failed to perceive the position of the autonomous vehicle V correctly. For example, the reason why the vehicle position perception unit 13 fails to perceive the position of the autonomous vehicle V correctly is that the GPS receiving unit 1 has failed to receive the position information correctly or that an abnormality has occurred in the camera etc. of the external sensor 2 and therefore the vehicle position perception unit 13 fails to perceive the position of the autonomous vehicle V by the SLAM technique. Accordingly, the abnormality determination unit 20 determines at the right turn point or the left turn point whether an abnormality has occurred in, for example, the GPS receiving unit 1 or the camera. In this case, for example, the GPS receiving unit 1 or the camera of the external sensor 2 is the in-vehicle device for which the abnormality determination is made.

The abnormality determination unit 20 does not necessarily make the abnormality determination for the camera and the steering mechanism at the abnormality determination point as described above, but can make the abnormality determination for various in-vehicle devices according to the type of abnormality determination point.

The abnormality determination unit 20 makes the abnormality determination for the in-vehicle device when a determination route is determined by the route determination unit 15 and the autonomous vehicle V is driving along the determination route. That is, the abnormality determination unit 20 makes the abnormality determination for the in-vehicle device when there is no user in the autonomous vehicle V.

As described above, when the autonomous vehicle V drives to the dispatch point to pick up the user, the autonomous driving system 100 determines a determination route for making the abnormality determination for the in-vehicle device based on the necessity of making the abnormality determination for the in-vehicle device (whether the restart condition is satisfied) etc. and drives the autonomous vehicle V along the determination route. While the autonomous vehicle V is driving along the determination route, the abnormality determination unit 20 makes the abnormality determination for the in-vehicle device at the abnormality determination point. After the autonomous vehicle V arrives at the dispatch point and the user gets into the autonomous vehicle V, the autonomous driving system 100 autonomously drives the autonomous vehicle V to the destination point designated by the user etc. based on a predetermined technique to transport the user.

When the abnormality determination unit 20 determines that an abnormality has occurred in the in-vehicle device, the autonomous driving system 100 can perform various processes that are supposed to be performed when an abnormality occurs, such as stopping autonomous driving of the autonomous vehicle V. When the abnormality determination unit 20 determines that no abnormality has occurred in the in-vehicle device, the autonomous driving system 100 may calibrate the in-vehicle device at, for example, the abnormality determination point.

Next, an abnormality determination method in which the autonomous driving system 100 makes the abnormality determination for the in-vehicle device at the abnormality determination point will be described with reference to the flowchart of FIG. 3. The flowchart shown in FIG. 3 is started when an instruction to start providing the service for transporting a user is input to the autonomous driving system 100. Before the instruction to start providing the transportation service is input to the autonomous driving system 100, the autonomous vehicle V has stopped providing the service and is in the standby (stopped) state.

As shown in FIG. 3, when the instruction to start providing the service is input to the autonomous driving system 100, the dispatch point setting unit 12 sets the dispatch point where the autonomous vehicle V picks up the user (S101). The route search unit 14 searches for travel routes from the current position of the autonomous vehicle V to the dispatch point (S102: route search step). The route determination unit 15 determines whether the restart condition is satisfied based on the non-operating time measured by the non-operating time measurement unit 11 (S103). When the restart condition is satisfied (S103: YES), the route determination unit 15 performs a process of determining a determination route for making the abnormality determination for the in-vehicle device from the travel routes searched by the route search unit 14 (S104: route determination step). The route determination unit 15 determines the travel route satisfying the following two conditions to be a determination route: the condition of the time required to reach the dispatch point and the condition of the threshold of the number of abnormality determination points. When the route determination unit 15 cannot determine a determination route (S105: NO), the route determination unit 15 instructs the route search unit 14 to expand the search range and search for travel routes again (S110). Based on this instruction, the route search unit 14 expands the search range and searches for travel routes again (S102).

On the other hand, when the determination route is determined by the route determination unit 15 (S105: YES), the trajectory generation unit 18 generates a trajectory for the autonomous vehicle V to drive along the determination route. The driving control unit 19 performs autonomous driving to autonomously drive the autonomous vehicle V along the determination route based on the generated trajectory (S106). The abnormality determination unit 20 makes the abnormality determination for the in-vehicle device at the abnormality determination point while the autonomous vehicle V is driving along the determination route (S107: abnormality determination step).

When it is determined in S103 that the restart condition is not satisfied (S103: NO), the route determination unit 15 determines the travel route requiring the shortest time to reach the dispatch point out of the travel routes searched by the route search unit 14 to be a travel route to be used for autonomous driving (S108). The trajectory generation unit 18 generates a trajectory for the autonomous vehicle V to drive along the travel route requiring the shortest time to reach the dispatch point as determined in S108. Based on the generated trajectory, the driving control unit 19 performs autonomous driving to autonomously drive the autonomous vehicle V along the travel route requiring the shortest time to reach the dispatch point (S109).

As described above, in the autonomous driving system 100, a determination route is determined based on the necessity of making the abnormality determination for the in-vehicle device and the number of abnormality determination points on the travel route. In the autonomous driving system 100, the abnormality determination for the in-vehicle device is made at the abnormality determination point while the autonomous vehicle V is autonomously driving along the determination route. Accordingly, in the autonomous driving system 100 and the abnormality determination method that is performed by the autonomous driving system 100, the route for making the abnormality determination for the in-vehicle device can be appropriately determined based on the necessity of making the abnormality determination for the in-vehicle device, and the abnormality determination for the in-vehicle device can be made while the autonomous vehicle V is driving.

The autonomous driving system 100 uses a situation in which the restart condition is satisfied as a situation in which there is the necessary of making the abnormality determination for the in-vehicle device. When the restart condition is satisfied, the route determination unit 15 determines the travel route in which the number of abnormality determination points is equal to or greater than the predetermined number threshold to be a determination route. For example, an abnormality may occur in the in-vehicle device before the autonomous vehicle V is restarted, such as the lens of the camera of the external sensor 2 becoming dirty due to the rain or wind. In this case, the driving performance of the autonomous vehicle V may be degraded due to the abnormality in the in-vehicle device after the autonomous vehicle V is restarted. Accordingly, the autonomous driving system 100 makes the abnormality determination for the in-vehicle device when the restart condition is satisfied. The autonomous driving system 100 can thus make the abnormality determination at an appropriate timing. The autonomous driving system 100 determines the travel route in which the number of abnormality determination points is equal to or greater than the number threshold to be a determination route. The autonomous driving system 100 can thus make the abnormality determination for the in-vehicle device an appropriate number of times.

The threshold of the number of abnormality determination points that is used for the abnormality determination for the in-vehicle device is determined in advance for each type of abnormality determination points. The route determination unit 15 determines the travel route in which the number of abnormality determination points of each type is equal to or greater than the corresponding number threshold to be a determination route. In this case, the route determination unit 15 can determine a more appropriate route to be a determination route for making the abnormality determination, based on the number threshold set for each type of abnormality determination points.

As described above as the first determination method, when there is a plurality of travel routes in which the number of abnormality determination points is equal to or greater than the number threshold, the route determination unit 15 can determine the travel route requiring the shortest time to reach the dispatch point to be a determination route. In this case, the autonomous driving system 100 can make the abnormality determination for the in-vehicle device and can also cause the autonomous vehicle V to reach the destination point more quickly.

As described above as the second determination method, when there is a plurality of travel routes in which the number of abnormality determination points is equal to or greater than the number threshold, the route determination unit 15 can determine the travel route with the largest number of abnormality determination points of the predetermined type to be a determination route. In this case, the autonomous driving system 100 can mainly make the abnormality determination corresponding to the abnormality determination point at each abnormality determination point of the predetermined type.

When no determination route is determined by the route determination unit 15, the route search unit 14 expands the search range and further searches for travel routes. The autonomous driving system 100 can thus increase the possibility that the route search unit 14 can search for a travel route that passes through an appropriate number of abnormality determination points.

The driving control unit 19 drives the autonomous vehicle V along the determination route when there is no occupant in the autonomous vehicle V. The abnormality determination unit 20 makes the abnormality determination for the in-vehicle device while the autonomous vehicle V is driving along the determination route. In this case, since there is no occupant in the autonomous vehicle V, the autonomous driving system 100 can make the abnormality determination for the in-vehicle device while the autonomous vehicle V is driving along the determination route without making the occupant feel uneasy regarding the route along which the autonomous vehicle V drives during the abnormality determination.

Although the embodiment of the present disclosure is described above, the disclosure is not limited to the above embodiment. For example, when determining a determination route based on the number of abnormality determination points on the route, the route determination unit 15 determines a determination route based on whether the number of abnormality determination points is equal to or greater than the predetermined number threshold. However, the present disclosure is not limited to this, and the route determination unit 15 may determine a determination route without using the number threshold. For example, the route determination unit 15 may determine the travel route with the largest number of abnormality determination points out of the searched travel routes to be a determination route. In this case, when there is a plurality of travel routes with the largest number of abnormality determination points, the route determination unit 15 determines the travel route with the largest number of types of abnormality determination points to be a determination route. As a result, the abnormality determination unit 20 can make the abnormality determination for the in-vehicle device according to the type of abnormality determination points a larger number of times on the determination route having a larger number of types of abnormality determination points. The route determination unit 15 may determine the travel route with the largest number of abnormality determination points of the predetermined type to be a determination route. In this case, the abnormality determination unit 20 can mainly perform the abnormality determination according to the predetermined type of abnormality determination points.

The autonomous vehicle V is not limited to the on-demand autonomous bus or taxi. For example, the autonomous vehicle V may be a semi-demand bus. In this case, the autonomous driving system 100 may determine the determination route and make the abnormality determination for the in-vehicle device in the manner described above when the autonomous vehicle V drives to the starting point (destination point) of a predetermined operation route (that is, before the start of operation of the autonomous vehicle V). As described above, even when the autonomous vehicle V is a semi-demand bus, the abnormality determination is made before the autonomous vehicle V starts providing the service, namely when there is no occupant in the autonomous vehicle V. This configuration will not make the occupant feel uneasy regarding the route along which the autonomous vehicle V drives during the abnormality determination.

In the above description, the abnormality determination is made when the autonomous vehicle V drives to the dispatch point. However, the present disclosure is not limited to this, and the autonomous driving system 100 may make the abnormality determination when the autonomous vehicle V drives to a point other than the dispatch point, such as a destination point set to make the abnormality determination.

What is claimed is:

1. An autonomous driving system configured to make an abnormality determination for an in-vehicle device at an abnormality determination point while an autonomous vehicle is driving autonomously, the autonomous driving system comprising:
a route search unit configured to search for a travel route from a departure point to a destination point;
a route determination unit configured to determine a determination route for making the abnormality determination for the in-vehicle device from the searched travel route, based on necessity of making the abnormality determination for the in-vehicle device and the number of the abnormality determination points on the travel route; and an abnormality determination unit configured to make the abnormality determination for the in-vehicle device at the abnormality determination point while the autonomous vehicle is driving along the determination route, wherein the abnormality determination unit makes the abnormality determination for the in-vehicle device according to a type of the abnormality determination point.

2. The autonomous driving system according to claim 1, wherein:

a situation where a restart condition is satisfied is a situation in which there is the necessity of making the abnormality determination for the in-vehicle device, the restart condition being a condition indicating that the autonomous vehicle has been restarted; and the route determination unit is configured to, when the restart condition is satisfied, determine the travel route as the determination route, the travel route being a route in which the number of the abnormality determination points is equal to or greater than a predetermined number threshold.

3. The autonomous driving system according to claim 2, wherein:

the number threshold is determined in advance for each type of the abnormality determination points; and the route determination unit is configured to determine the travel route as the determination route, the travel route being a route in which the number of the abnormality determination points of at least one type is equal to or greater than the corresponding number threshold to be the determination route.

4. The autonomous driving system according to claim 2, wherein the route determination unit is configured to determine the travel route requiring shortest time to reach the destination point to be the determination route when there is a plurality of the travel routes in which the number of the abnormality determination points is equal to or greater than the number threshold.

5. The autonomous driving system according to claim 2, wherein:

the route determination unit is configured to determine the travel route with the largest number of the abnormality determination points for a predetermined type as the determination route when there is a plurality of the travel routes; and the travel routes are routes in which the number of the abnormality determination points is equal to or greater than the number threshold.

6. The autonomous driving system according to claim 1, wherein the route search unit is configured to expand a search range and further search for the travel route when the determination route is not determined by the route determination unit.

7. The autonomous driving system according to claim 1, further comprising a driving control unit configured to:

control driving of the autonomous vehicle; and drive the autonomous vehicle autonomously along the determination route, wherein the driving control unit is configured to drive the autonomous vehicle along the determination route when there is no occupant in the autonomous vehicle.

8. The autonomous driving system according to claim 1, wherein the abnormality determination unit is configured to make the abnormality determination based on a determination of the in-vehicle device failure to calibrate.

9. An abnormality determination method that is performed by an autonomous driving system configured to make an abnormality determination for an in-vehicle device at an abnormality determination point while an autonomous vehicle is driving autonomously, the abnormality determination method comprising:

a route search step of searching for a travel route from a departure point to a destination point;

a route determination step of determining a determination route for making the abnormality determination for the in-vehicle device from the searched travel route, based on necessity of making the abnormality determination for the in-vehicle device and the number of the abnormality determination points on the travel route; and an abnormality determination step of making the abnormality determination for the in-vehicle device at the abnormality determination point while the autonomous vehicle is driving along the determination route, wherein the abnormality determination for the in-vehicle device is made according to a type of the abnormality determination point.

10. The abnormality determination method according to claim 9, wherein abnormality determination step of making the abnormality determination for the in-vehicle device is based on a determination on the in-vehicle device failure to calibrate.

11. An autonomous driving system comprising an electronic control unit configured to:

make an abnormality determination for an in-vehicle device at an abnormality determination point while an autonomous vehicle is driving autonomously, the abnormality determination for the in-vehicle device is made according to a type of the abnormality determination point;

search for a travel route from a departure point to a destination point;

determine a determination route for making the abnormality determination for the in-vehicle device from the searched travel route, based on necessity of making the abnormality determination for the in-vehicle device and the number of the abnormality determination points on the travel route; and make the abnormality determination for the in-vehicle device at the abnormality determination point while the autonomous vehicle is driving along the determination route.

12. The autonomous driving system according to claim 11, wherein:

a situation where a restart condition is satisfied is a situation in which there is the necessity of making the abnormality determination for the in-vehicle device, the restart condition being a condition indicating that the autonomous vehicle has been restarted; and the electronic control unit is configured to, when the restart condition is satisfied, determine the travel route as the determination route, the travel route being a route in which the number of the abnormality determination points is equal to or greater than a predetermined number threshold.

13. The autonomous driving system according to claim 12, wherein:

the number threshold is determined in advance for each type of the abnormality determination points; and the electronic control unit is configured to determine the travel route as the determination route, the travel route being a route in which the number of the abnormality determination points of at least one type is equal to or greater than the corresponding number threshold to be the determination route.

14. The autonomous driving system according to claim 12, wherein the electronic control unit is configured to determine the travel route requiring shortest time to reach the destination point to be the determination route when there is a plurality of the travel routes in which the number of the abnormality determination points is equal to or greater than the number threshold.

15. The autonomous driving system according to claim 12, wherein:
- the electronic control unit is configured to determine the travel route with the largest number of the abnormality determination points for a predetermined type as the determination route when there is a plurality of the travel routes; and
- the travel routes are routes in which the number of the abnormality determination points is equal to or greater than the number threshold.

16. The autonomous driving system according to claim 11, wherein the electronic control unit is configured to expand a search range and further search for the travel route when the determination route is not determined by the electronic control unit.

17. The autonomous driving system according to claim 11, wherein the electronic control unit is configured to:
- control driving of the autonomous vehicle;
- drive the autonomous vehicle autonomously along the determination route; and
- drive the autonomous vehicle along the determination route when there is no occupant in the autonomous vehicle.

18. The autonomous driving system according to claim 11, wherein the electronic control unit is configured to make the abnormality determination based on a determination of the in-vehicle device failure to calibrate.

* * * * *